United States Patent
Watson (10) Patent No.: US 8,656,174 B2
(45) Date of Patent: *Feb. 18, 2014

(54) RECOVERING FROM DE-SYNCHRONIZATION ATTACKS AGAINST WATERMARKING AND FINGERPRINTING

(75) Inventor: Stephen Watson, Toronto (CA)

(73) Assignee: Kaleidescape, Inc., Sunnyvale, CA (US)

(*) Notice: Subject to any disclaimer, the term of this patent is extended or adjusted under 35 U.S.C. 154(b) by 506 days.

This patent is subject to a terminal disclaimer.

(21) Appl. No.: 11/707,631

(22) Filed: Feb. 16, 2007

(65) Prior Publication Data

US 2007/0240234 A1    Oct. 11, 2007

Related U.S. Application Data

(63) Continuation of application No. 10/377,266, filed on Feb. 28, 2003, now Pat. No. 7,188,248, which is a continuation of application No. 10/378,046, filed on Feb. 28, 2003, now Pat. No. 7,036,024, and a continuation of application No. 10/356,692, filed on Jan. 31, 2003, now Pat. No. 7,111,171, and a continuation of application No. 10/356,322, filed on Jan. 31, 2003, now Pat. No. 7,003,131.

(60) Provisional application No. 60/394,630, filed on Jul. 9, 2002, provisional application No. 60/394,922, filed on Jul. 9, 2002, provisional application No. 60/394,588, filed on Jul. 9, 2002.

(51) Int. Cl.
*H04L 9/00* (2006.01)

(52) U.S. Cl.
USPC ............... 713/176; 713/180; 726/26; 726/30; 726/31; 726/33; 380/261

(58) Field of Classification Search
USPC ........................................... 713/176
See application file for complete search history.

(56) References Cited

U.S. PATENT DOCUMENTS 5,613,492 A    3/1997    Feinberg
5,664,018 A *  9/1997    Leighton ............... 380/54
(Continued)

FOREIGN PATENT DOCUMENTS

WO    WO 2004/070998 A2    8/2004

OTHER PUBLICATIONS

Izquierdo, E.,'Using invariant Image Features for Synchronization in Spread Spectrum Image Watermarking', EURASIP Journal on applied processing, 2002, Hindawi Publ. Corp., www.hindawi.com/GetPDF.aspx?pii=S1110865702000719.*

(Continued)

*Primary Examiner* — Edan Orgad
*Assistant Examiner* — Ronald Baum (57) ABSTRACT

The invention provides a method of recovering from de-synchronization attacks includes registering original and altered digital content using nonlinear transformations to iteratively attempt to provide better-approximated registration. Approximation occurs at more than one level of granularity, by selecting among a greater number of possible transformation functions at each step. Transformations and comparisons might be conducted directly on pixel values, on coefficients for a set of basis wavelets, or on some transformation of the original and altered digital content. A human operator might assist this process, such as by suggesting transformations or providing evaluation of the degree of registration. Upon resynchronization, embedded identifying information in the original digital content is recovered.

26 Claims, 2 Drawing Sheets

(56) References Cited

U.S. PATENT DOCUMENTS

| | | | |
|---|---|---|---|
| 5,859,920 A * | 1/1999 | Daly et al. ............... 382/115 |
| 6,108,434 A | 8/2000 | Cox et al. |
| 6,154,571 A | 11/2000 | Cox et al. |
| 6,252,971 B1 | 6/2001 | Wang |
| 6,278,792 B1 | 8/2001 | Cox et al. |
| 6,285,774 B1 * | 9/2001 | Schumann et al. ........ 382/100 |
| 6,292,683 B1 | 9/2001 | Gupta et al. |
| 6,373,960 B1 | 4/2002 | Conover et al. |
| 6,385,329 B1 | 5/2002 | Sharma et al. |
| 6,400,826 B1 | 6/2002 | Chen et al. |
| 6,483,927 B2 | 11/2002 | Brunk et al. |
| 6,556,689 B1 | 4/2003 | Xia et al. |
| 6,563,935 B1 | 5/2003 | Echizen et al. |
| 6,567,533 B1 | 5/2003 | Rhoads |
| 6,571,021 B1 | 5/2003 | Braudaway |
| 6,577,745 B1 | 6/2003 | Op De Beeck et al. |
| 6,580,808 B2 | 6/2003 | Rhoads |
| 6,587,601 B1 * | 7/2003 | Hsu et al. ................. 382/294 |
| 6,614,914 B1 | 9/2003 | Rhoads et al. |
| 6,628,802 B1 | 9/2003 | Braudaway et al. |
| 6,633,653 B1 | 10/2003 | Hobson et al. |
| 6,671,388 B1 | 12/2003 | Op De Beeck et al. |
| 6,674,876 B1 | 1/2004 | Hannigan et al. |
| 6,683,966 B1 * | 1/2004 | Tian et al. ................. 382/100 |
| 6,700,990 B1 | 3/2004 | Rhoads |
| 6,704,869 B2 | 3/2004 | Rhoads et al. |
| 6,714,683 B1 | 3/2004 | Tian et al. |
| 6,718,047 B2 * | 4/2004 | Rhoads ..................... 382/100 |
| 6,721,439 B1 | 4/2004 | Levy et al. |
| 6,724,911 B1 | 4/2004 | Cox et al. |
| 6,738,493 B1 | 5/2004 | Cox et al. |
| 6,751,337 B2 | 6/2004 | Tewfik et al. |
| 6,804,375 B2 | 10/2004 | Muratani |
| 6,826,290 B1 | 11/2004 | Murakami et al. |
| 6,904,151 B2 | 6/2005 | Deguillaume et al. |
| 6,971,013 B2 | 11/2005 | Mihcak et al. |
| 7,046,819 B2 * | 5/2006 | Sharma et al. ............. 382/100 |
| 7,197,156 B1 * | 3/2007 | Levy ......................... 382/100 |
| 8,355,525 B2 * | 1/2013 | McKinley et al. ......... 382/100 |
| 2001/0016051 A1 | 8/2001 | Rhoads |
| 2001/0026377 A1 | 10/2001 | Ikegami |
| 2002/0002679 A1 * | 1/2002 | Murakami et al. ........ 713/176 |
| 2002/0021823 A1 | 2/2002 | Muratani |
| 2002/0049908 A1 | 4/2002 | Shimosato et al. |
| 2002/0091930 A1 * | 7/2002 | Kohl et al. ................. 713/182 |
| 2002/0112165 A1 | 8/2002 | Hein et al. |
| 2002/0114491 A1 | 8/2002 | Sharma et al. |
| 2002/0118831 A1 | 8/2002 | Rhoads |
| 2002/0146149 A1 | 10/2002 | Brunk |
| 2002/0172394 A1 | 11/2002 | Venkatesan et al. |
| 2002/0176003 A1 | 11/2002 | Seder et al. |
| 2002/0196976 A1 | 12/2002 | Mihcak et al. |
| 2002/0199107 A1 * | 12/2002 | Epstein ....................... 713/176 |
| 2003/0012401 A1 | 1/2003 | Sharma et al. |
| 2003/0039377 A1 | 2/2003 | Rhoads et al. |
| 2003/0081857 A1 * | 5/2003 | Tapson ....................... 382/275 |
| 2003/0088327 A1 | 5/2003 | Taori et al. |
| 2003/0095685 A1 | 5/2003 | Tewfik et al. |
| 2003/0131243 A1 | 7/2003 | Pelly et al. |
| 2004/0003052 A1 | 1/2004 | Yoda |
| 2004/0059918 A1 | 3/2004 | Xu |
| 2004/0105569 A1 | 6/2004 | Sharma et al. |
| 2004/0131184 A1 | 7/2004 | Wu et al. |
| 2004/0250079 A1 | 12/2004 | Kalker et al. |
| 2004/0258273 A1 | 12/2004 | Brunk |
| 2004/0267533 A1 | 12/2004 | Hannigan et al. |
| 2005/0154892 A1 | 7/2005 | Mihcak et al. |

OTHER PUBLICATIONS

PCT, Written Opinion for Application PCT/US04/00300, Apr. 7, 2005.

Izquierdo, "Using Invariant Image Features for Synchronization in Spread Spectrum Image Watermarking", EURASIP Journal on Applied Processing, pp. 410-417 (2002).

Fridrich, "Copyright Protection of Digital Images (Authentication)", available at: http://www.ws.binghamton.edu/fridrich/Research/tutor2.ppt, version published Feb. 18, 2003.

Rey et al, "A Survey of Watermarking Algorithms for Image Authentication", EURASIP Journal on Applied Processing, pp. 613-621 (2002).

Braudaway et al. "Automatic recovery of invisible image watermarks from geometrically distorted images." Proceedings of the SPIE, Security and Watermarking of Multimedia Contents II, May 2000, pp. 74-81, vol. 3971. [Abstract].

Johnson et al. "Recovery of Watermarks from Distorted Images." Proc. Information Hiding, Lecture Notes in Computer Science 1768, 1999, pp. 318-322.

Kybic. "Elastic Image Registration using Parametric Deformation Models." http://cmp.felk.cvut.cz/~kybic/thesis.

* cited by examiner

Fig. 1

Fig. 2

RECOVERING FROM DE-SYNCHRONIZATION ATTACKS AGAINST WATERMARKING AND FINGERPRINTING

BACKGROUND OF THE INVENTION

1. Field of the Invention

The invention relates to distribution of digital content.

2. Related Art

Distribution of digital content for media streams, such as for example movies, is subject to several problems. One problem is that it is easy to make exact copies of digital content, thus allowing any recipient of that content to redistribute it, whether authorized or not. It would be advantageous to be able to distribute digital content, particularly digital content for media streams, without fear of its unauthorized distribution. This would be particularly advantageous when it is desired to distribute digital content using a communication link, such as for example a computer network or other technique for distribution to end viewers (for example, either on demand, in anticipation of future demand, or in response to something else).

One known solution is to mark digital content with a "fingerprint," that is, information sufficient to identify the recipient of the digital content, so that an unauthorized distributor of the content can be determined, thus hopefully deterring potential unauthorized distributors. Other known solutions include marking digital content with a "watermark," that is, information sufficient to identify the digital content itself. Thus for example, if a recipient of the digital content distributes it without authorization, that recipient can be identified and called to account for that activity. However, fingerprinting and watermarking of digital content are subject to several problems. Among these problems are several possible attacks, notably including the possibility of reformatting the media streams into new digital content representing the media streams, with the effect that the new digital content is significantly different from the original digital content, and with the effect that detection of identifying information from the original digital content is made substantially more difficult. Differences can include new data formats, new frame rates, new pixel resolution, new viewing angles, and the like. Such differences, and any other attack with the effect that new presentation of the media streams in which new digital content (such as its data pixels) cannot be easily aligned with the original data content (such as original data pixels) are herein sometimes called "de-synchronization attacks."

Fingerprinting and watermarking techniques often depend on being able to compare elements of the original digital content, such as for example data found in individual pixels, with related elements of the digital content after an attack, such as for example a de-synchronization attack. For a first example, the Stirmark benchmarking tool induces local bending of the media stream, in the expectation that is difficult to undo that local bending, so as to closely associate the altered digital content with the original digital content. For a second example, digital to analog conversion of the original digital content, followed by analog to digital conversion back (and possibly combined with some form of analog distortion), thus producing new digital content, is likely to disassociate those individual pixels that are grouped together into blocks. This would have the probable effect that individual pixels after both conversions are performed have new positions that do not coincide with their positions before the attack, and would have the possible effect that individual pixels from an original single block before the attack would lie in several different blocks after the attack.

It would be advantageous to provide a technique by which de-synchronization attacks can be thwarted, with the effect that recipients responsible for distributed digital content can be identified notwithstanding such attacks.

SUMMARY OF THE INVENTION

A method of recovering from de-synchronization attacks against watermarking and fingerprinting includes (1) aligning (herein sometimes called "registering" or "resynchronizing") original and altered digital content, (2) with the effect of recovering embedded identifying information, and (3) with the effect of providing the capability of identifying recipients of the original digital content using fingerprinting or watermarking techniques.

In an aspect of the invention, the altered digital content is registered with the original digital content using nonlinear transformations, and in successive attempts at better registration using approximation at more than one level of granularity. For example, not intended to be limiting in any way, a sequence of transformations might be applied to the altered digital content, each with the effect of transforming the altered digital content into a form closer to the original digital content. The sequence itself orders the transformations to be attempted so that those transformations that are less distorting, less nonlinear, and simpler, are attempted earlier, while those transformations that are more distorting, more nonlinear, and more complex, are attempted later, with the effect that the composite transformation used to bring the altered digital content to within acceptable closeness of the original digital content is itself relatively less distorting, less nonlinear, and simpler. In one embodiment, a human operator (or another external source of suggestions for registration) is available to assist the registration process, such as by providing suggestions for transformation functions or by providing assessments of the approximate success of transformation functions.

In an aspect of the invention, transformations applied to the digital content might treat alterations to some encoded aspects of the media stream, such as a movie, differently from others. For a first example, not intended to be limiting in any way, alterations to spatial distances might be treated differently from alterations to timing. For a second example, also not intended to be limiting in any way, alterations to color might be treated differently from alterations to brightness or contrast. In general, transformations that cause relatively more severe distortion to the media stream, or its likely perception thereof by end users, are discouraged, on the presumption that the post-attack digital content is intended to still have value as a representation of that media stream. However, specific transformations that might have severe effects on relatively localized portions of the media stream, are relatively less discouraged, such as for example distortions to correct interlacing, de-interlacing, pull-downs or timing changes. Other specific transformations might have other known effects, whether relatively localized or not, are also possible, such as for example anamorphic distortions. Transformations in a spatial domain, such as for example RGB, YUV, or hue and saturation, are also preferred, as possibly are transformations in wavelet domains.

While in one embodiment, the method performs deformations and comparisons in a spatial domain, that is, on actual pixel values (although possibly responsive to differences between luminance, hue, saturation, or combinations or mixtures thereof), other techniques for comparing digital content may be used, such as performing deformations and comparisons on DCT (discrete cosine transform) coefficients, or on wavelet coefficients, for a set of suitably selected basis wavelets.

Similarly, while in one embodiment, the method performs deformations and comparisons on the actual digital content (both original digital content and altered digital content), other techniques for comparing digital content may be used, such as performing deformations and comparisons on some transformation of the actual digital content (both original digital content A and altered digital content B). For a first example, the digital content (both original digital content A and altered digital content B) may be filtered before processing by the method. A low-pass filter F[ ] may make it easier to arrive at a coarse-grain deformation bringing a deformation of F[B] close to F[A], at which point the method may be re-performed to arrive at a finer-grain deformation bringing a deformation of B close to A. For a second example, A and B may be processed using their gradient G[ ]. A gradient G[ ] may make it easier to arrive at a coarse-grain registration of edges bringing a deformation of G[B] close to G[A], at which point the method may be re-performed to arrive at an unfiltered deformation bringing a deformation of B close to A.

With regard to movies and other visual media, it would be advantageous to perform registration, and thus resynchronization, to within a fraction of a pixel, that is, so that comparisons are possible between pixels of the original digital content and the post-attack digital content. Similarly, with regard to movies and other media involving time sequences, it would be advantageous to perform registration, and thus resynchronization, to within a fraction of a voxel (that is, the cross product of a pixel and a time quantum). In one embodiment, inter-pixel values or inter-voxel values for both the original digital content and the post-attack digital content might be determined in response to spline interpolation of those pixel values or voxel values (not necessarily using the using same spline functions as would be used for transformation of the post-attack digital content to an approximation of the original digital content), with the effect that a resynchronizing transformation might map an individual pixel or voxel of the original digital content to an interpreted pixel or voxel of the post-attack digital content, or vice versa.

The invention is not restricted to movies, but is also applicable to other media streams, such as for example animation or sound, as well as to still media, such as for example pictures or illustrations, and to databases and other collections of information.

INCORPORATED DISCLOSURES

This application claims priority of the following documents, each of which is hereby incorporated by reference as if fully set forth herein.

U.S. provisional patent application 60/394,630, filed Jul. 9, 2002, in the name of Michael Malcolm, Stephen Watson, Daniel Collens, and Kevin Hui, titled "Watermarking and Fingerprinting a Movie for Secure Distribution."

U.S. provisional patent application 60/394,922, filed Jul. 9, 2002, in the name of Michael Malcolm, Stephen Watson, and Daniel Collens, titled "System Architecture of a System for Secure Distribution of Media."

U.S. provisional patent application 60/394,588, filed Jul. 9, 2002, in the name of Michael Malcolm, Stephen Watson, and Daniel Collens, titled "Topology of Caching Nodes in a System for Secure Delivery of Media Content."

U.S. patent application Ser. No. 10/356,692, filed Jan. 31, 2003, in the name of the same inventors as this application, titled "Parallel Distribution and Fingerprinting of Digital Content."

U.S. patent application Ser. No. 10/356,322, filed Jan. 31, 2003, in the name of the same inventors as this application, titled "Watermarking and Fingerprinting Digital Content Using Alternative Blocks to Embed Information."

U.S. patent application Ser. No. 10/378,046, filed Feb. 28, 2003, in the name of the same inventors as this application, titled "Detecting Collusion Among Multiple Recipients of Fingerprinted Information."

U.S. application Ser. No. 10/377,266, filed Feb. 28, 2003, now allowed, in the name of inventor Stephen Watson, titled "Recovering from De-Synchronization Attacks Against Watermarking and Fingerprinting."

These documents are hereby incorporated by reference as if fully set forth herein, and are sometimes referred to herein as the "incorporated disclosures."

Inventions described herein can be used in combination or conjunction with technology described in the incorporated disclosures.

DETAILED DESCRIPTION OF THE PREFERRED EMBODIMENT

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

The phrase "media stream" describes information intended for presentation in a sequence, such as motion pictures including a sequence of frames or fields, or such as audio including a sequence of sounds. As used herein, the phrase "media stream" has a broader meaning than the standard meaning for "streaming media," (of sound and pictures that are transmitted continuously using packets and that start to play before all of the content arrives). Rather, as described herein, there is no particular requirement that "media streams" must be delivered continuously. Also as described herein, media streams can refer to other information for presentation, such as for example animation or sound, as well as to still media, such as for example pictures or illustrations, and also to databases and other collections of information.

The phrase "digital content" describes data in a digital format, intended to represent media streams or other information for presentation to an end viewer. "Digital content" is distinguished from packaging information, such as for example message header information. For the two phrases "digital content" and "media stream,"

the former describes a selected encoding of the latter, while the latter describes a result of presenting any encoding thereof.

The phrase "embedded information in a media stream" describes information incorporated into a set of digital content representing that media stream, in a form capable of later detection. For example, digital content representing media streams might include embedded information, such that the media streams are still capable of presentation to viewer without substantial change, but in which the embedded information can be recovered by suitable processing of the digital content.

The term "watermark" describes a schema for digital content by which information can be embedded into that digital content. In preferred embodiments, as described in related applications, an attacker cannot easily remove the watermark. However, the concept of a watermark as described herein is sufficiently general to include watermarks that are not so resistant to attack, or which use other techniques for embedding information.

The term "fingerprint" and the phrase "embedded identifying information" describe sets of information sufficient to identify at least one designated recipient of digital content. In a preferred embodiment, as described in a related application, multiple attackers colluding together cannot easily remove the fingerprint provided by the invention, or prevent at least one of them from being detected as unauthorized distributor of the digital content. However, the concept of the fingerprint as described herein is sufficiently general to include fingerprints that are not so resistant to removal, or do not provide such capability for detecting unauthorized distributors of the digital content, or which use other techniques for embedding information, for detecting the embedded information, or for detecting unauthorized distributors of the digital content.

The term "de-synchronization" describes an attack against either fingerprinting or watermarking, in which original digital content representing media streams is reformatted into altered digital content representing substantially similar media streams, but with the effect that detecting identifying information from the original digital content is made relatively difficult. For example, differences can include new data formats, new frame rates, new pixel resolution, new viewing angles, and the like.

The phrases "original movie" and "alt-movie" describe alternative versions of the same media stream, such as one being an original version of that media stream introduced into a system using aspects of the invention, and another being an alternative version of that same media stream generated in response to the original movie. Similarly, the phrases "original block" and "alt-block" describe alternative versions of the same individual block or macroblock within the original movie or alt-movie. As described in a related application, a difference between the original movie and the alt-movie is historical, in that the alt-movie can be substituted for the original movie in nearly every respect. Similarly, a difference between any one original block and its associated alt-block is historical, in that the alt-block can be substituted for the original block in nearly every respect.

The phrases "original digital content" and "altered digital content" describe digital content representing media streams, in a first format (original digital content) and in a second format (altered digital content), the altered digital content having been produced in response to the original digital content and with the intent of representing substantially similar media streams, but with the effect that detecting identifying information from the original digital content is made relatively difficult. Thus, the altered digital content is a result of a de-synchronization attack on the original digital content. In preferred embodiments, the original digital content might be an actual original of some digital content before it was subject to a de-synchronization attack, or might be a constructed form of digital content, such as in response to an original movie and alt-movie, or in response to a set of original blocks and alt-blocks. For one example, not intended to be limiting in any way, the original digital content might be an average of the original movie and the alt-movie, or there might be two sets of original digital content, one for the original movie and one for the alt-movie. In one embodiment, a typical case of original digital content will include a block-by-block selection from the blocks of the original movie and the alt-movie. However, in the context of the invention, there is no particular restriction to such formats being used or included as the "original digital content" for which resynchronization is sought. Moreover, as described below, numerous variations on this theme are all within the scope and spirit of the invention, and would be workable without undue experimentation or further invention.

The terms "registering" and "resynchronization" describe a process by which a transformation from original digital content to altered digital content (or a transformation from altered digital content to original digital content) is found, with the effect that identifying information from the original digital content can be recovered from the altered digital content.

The phrase "human operator" very generally describes an information source external to the method described herein, specifically including an individual human being exercising human judgment, but also specifically possibly including a set of human beings, a computer program designed for expertise in assessment of the digital content, and artificial intelligence program capable of such assessment, or even a perceptive animal (such as for example a pigeon) trained or conditioned to make such assessment.

The terms "pixel" and "voxel" describe, respectively, an individual picture element in a media stream having a visual presentation, and an individual picture element at an individual instant in time in a media stream having a sequential visual presentation over time. For example, not intended to be limiting in any way, a pixel might represent an individual unit of space in a 1280×1024 display, while a voxel might represent an individual unit of space-time in a 1280×1024 display being displayed as a movie at 30 frames per second. More generally, the terms "pixel" and "voxel" describe, respectively, individual data elements and individual data elements in a time-varying presentation. For example, not intended to be limiting in any way, an individual volume of airflow in a simulation would be referred to herein as a pixel, while that same individual volume of airflow for a specified quantum of simulation time would be referred to herein as a voxel.

The term "transcoding" describes a technique by which original digital content representing streaming media using a first encoding technique is decoded, into an intermediate form such as possibly a human-perceivable form (although the intermediate form need not be human-perceivable and might simply be an uncompressed set of digital content representing the media stream), and re-encoded using a second encoding technique into altered digital content representing substantially similar streaming media. There is no particular requirement that the human-perceivable form, or other intermediate form, is actually presented to an end viewer, or to a device capable of receiving pixels that might have been presented to an end viewer. Thus for example, transcoding generally includes without limitation such changes from the original digital content to altered digital content as changing a pixel resolution for representation of frames of the streaming media, changing a frame rate or field rate for representation of the streaming media, changing an aspect ratio or viewing angle for representation of the streaming media, changing a brightness value or contrast value or color saturation value for representation of the streaming media, and the like.

The scope and spirit of the invention is not limited to any of these definitions, or to specific examples mentioned therein, but is intended to include the most general concepts embodied by these and other terms.

System Elements

Figure 1:
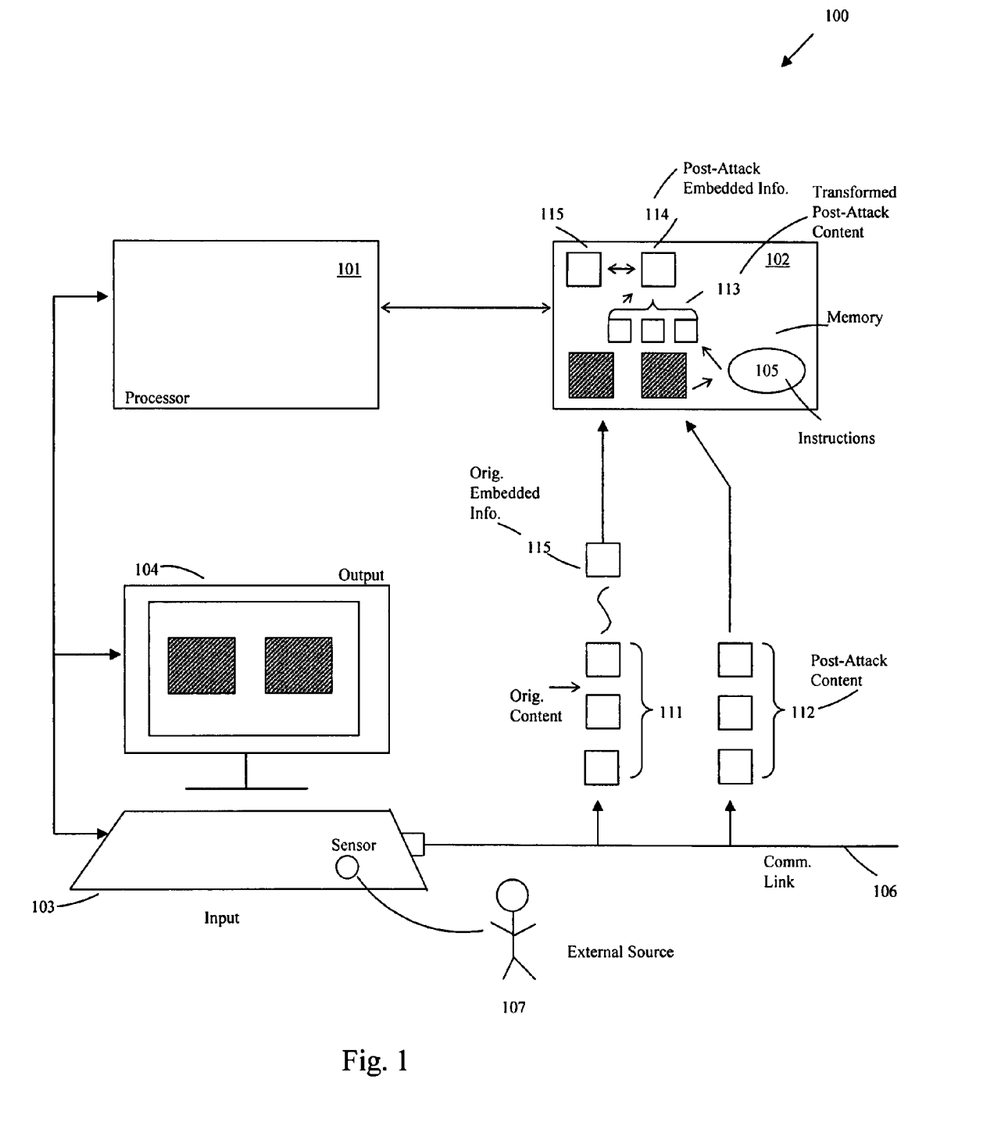
FIG. 1 shows a block diagram of a system for recovering from de-synchronization attacks against watermarking and fingerprinting.

FIG. 1 shows a block diagram of a system for recovering from de-synchronization attacks against watermarking and fingerprinting.

A system 100 includes a processor 101, program and data memory or mass storage 102, at least one input element 103, and preferably at least one output element 104.

The memory or mass storage 102 is capable of including instructions 105 capable of being executed or interpreted by the processor 101 to perform steps as described herein. The memory or mass storage 102 is also capable of receiving copies of at least portions of a set of original digital content 111 and a set of post-attack digital content 112 (herein sometimes called "altered" digital content), where the post-attack digital content 112 may have been derived from the digital content 111 in response to a de-synchronization attack. Either the entire original digital content 111 and post-attack digital content 112, or comparable portions thereof, might be maintained in the memory or mass storage 102.

In those cases where only comparable portions thereof are maintained in the memory or mass storage 102, the at least one input element 103 preferably includes at least one communication link 106, the communication link 106 being capable of receiving the original digital content 111 and post-attack digital content 112, or portions thereof, and capable of coupling them to the memory or mass storage 102.

The at least one input element 103 preferably includes a sensor capable of receiving transformation suggestions from an external source 107 of transformation suggestions. Similarly, the at least one output element 104 preferably includes a display capable of presenting results of transformations and differences between original digital content 111 and post-attack digital content 112, or transformed, filtered, or otherwise altered comparable versions thereof. The external source 107 might include (1) a human being capable of determining whether images are approximately aligned, (2) a program capable of evaluating the value of a transformation in response to at least portions of the original digital content 111 and post-attack digital content 112, (3) an Artificial Intelligence program capable of making transformation suggestions, (4) a trained or trainable neural network, whether artificial or a conditioned animal, capable of providing an evaluation of a value of a transformation in response to at least portions of the original digital content 111 and post-attack digital content 112, or (5) some combination or mixture thereof.

As described below, the instructions 105 direct the system 100 to perform the following actions:

(A1) to generate a set of transformed digital content 113 in response to the post-attack digital content 112, and (A2) to compare that transformed digital content 113 with the original digital content 111, with the effect that (A3) the transformed digital content 113 is as similar as reasonably possible to the original digital content 111.

The specific transformations to be applied are further described below.

As described below, the instructions 105 also direct the system 100 to perform the following actions:

(B1) to identify post-attack fingerprinting or watermarking information 114 in response to the transformed digital content 113, and (B2) to compare that post-attack fingerprinting or watermarking information 114 with original fingerprinting or watermarking information 115 identifiable from the original digital content 111, with the effect that (B3) the post-attack digital content 112 can be identified as derivative of the original digital content 111, in the case of watermarking information, or (B4) the post-attack digital content 112 can be identified as derivative of at least one specific copy of the original digital content 111, in the case of fingerprinting information.

In a preferred embodiment, the system 100 uses a method of watermarking and fingerprinting, and a method for identifying watermarking and fingerprinting information, such as for example described in related applications for watermarking digital content ("WATERMARKING AND FINGERPRINTING DIGITAL CONTENT USING ALTERNATIVE BLOCKS TO EMBED INFORMATION"). In a preferred embodiment, the system 100 uses a method of identifying colluding recipients of fingerprinting information, such as for example described in related applications for identifying colluding recipients of fingerprinting information ("DETECTING COLLUSION AMONG MULTIPLE RECIPIENTS OF FINGERPRINTED INFORMATION").

Some specific methods of identifying post-attack fingerprinting or watermarking information 114, and comparing that post-attack fingerprinting or watermarking information 114 with original fingerprinting or watermarking information 115, are further described below.

Transforming Digital Content

The system 100 performs an iterative or recursive process having a sequence of stages 1 to N, with the effect that each stage n (whether initial, intermediate, or final, as n progresses from initial stage 1 to final stage N) of the process generates a transformation on the post-attack digital content 112, and therefore a set of transformed digital content 113, that can be compared with the original digital content 111. In one embodiment, the external source 107 of transformation suggestions is available to assist the registration process. At the final stage N, when the transformed digital content 113 is deemed to meet a selected test for sufficient similarity to the original digital content 111, the iterative or recursive process is deemed to have sufficiently resynchronized the post-attack digital content 112 with the original digital content 111.

In a preferred embodiment, the process is conducted iteratively over a finite sequence of steps n, as n→∞ (more specifically, as n is stepped from 1 to N), where:

A represents the original digital content $B_0$ represents the post-attack, or otherwise altered, digital content $B_n$ represents the transformed post-attack digital content, after the step n $d_n(\ )$ represents a deformation to be applied at the step n $e_n(\ )$ represents a composition of the deformations $d_n(\ )$, up to and including the step n $p_n$ represents a set of parameters allowed to be selected at the step n (that is, $p_n$ is a set of variables that might have values assigned thereto)

$p_n^*$ represents a set of parameters actually selected at the step n (that is, $p_n^*$ is a set of values assigned to the variables $p_n$)

$s(,)$ represents a distance function between pairs of digital content $S_n$ represents a value of the distance function after the step n $S_\infty$ represents a termination threshold value of the distance function $R_\infty$ represents a termination threshold ratio of the distance function $M_i$ represents an individual $i^{th}$ block in the transformed post-attack digital content (that is, after the post-attack digital content has been transformed at the final step N)

$P_i$ represents a corresponding $i^{th}$ original block from the original digital content (that is, the corresponding block if the fingerprinting information was logical "0")

$Q_i$ represents a corresponding $i^{th}$ alt-block from the original digital content (that is, the corresponding block if the fingerprinting information was logical "1")

$F_i$ represents a corresponding $i^{th}$ fingerprinting bit

Accordingly, the process iteratively defines $d_n$ for n>0, with the effect that a difference s $(A, d_n(B)) \rightarrow$ a minimum possible value, as $n \rightarrow \infty$. This minimum possible value is hopefully nearly 0, but might be lower-bounded in response to noise or other factors, such as for example fingerprint information embedded in the original digital content A.

At each step n, the method selects $p_n^*$ from the possible values for the parameters in $p_n$, where the number of parameters in $p_n \rightarrow \infty$ as $n \rightarrow \infty$, and where $p_n^*$ are selected such that $s(A, d_n(B_n))$ is minimized over all possible values for the parameters in $p_n$. For example, $d_n$ might represent a linear-algebraic or other sum of transformations, responsive to a set of basic transformations selected by nonzero values $p_n^*$ for $p_n$, the parameters allowed to be nonzero at step n.

Thus, for example, at n=1, the method selects $p_1^*$ such that $s(,)$ applied to A and to $B_1=d_1(B_0)$, is minimized. Similarly, for example, at n=2, the method selects $p_2^*$ such that $s(,)$ applied to A and to $B_2=d_2(B_1)$, is minimized. The successive values of $B_n$ are preferably computed using $e_n(B_0)$ to avoid loss of precision due to compounded rounding errors.

In a preferred embodiment, the deformations $d_n$ are selected from spline interpolations of relatively short basis functions, where the parameters $p_n$ define those specific basis functions to be allowed at each step n. In a preferred embodiment, the specific spline interpolations used are cubic B-splines; however, in alternative embodiments, functions using cubic B-splines as portions thereof, wavelet splines, or other deformations may be used in combination, conjunction, or instead.

In alternative embodiments, the set of all possible coefficients for combining basis functions may define a relatively higher-dimensional space T, from which a relatively lower-dimensional subspace $T_n$ is selected at each step n, where $T_n$ is a result of a projection of T onto $R^n$, the set of all possible n-tuples of real coefficients, or where $T_n$ is a projection of T onto $C^n$, the set of all possible n-tuples of complex coefficients, as $n \rightarrow \infty$. In such alternative embodiments, the method would select $d_n(\ )$ equal to the dot product of $t_n$ and $\xi_n$, where $t_n$ is an element of $T_n$, and $\xi_n$ is a set of at least n basis functions at each step n.

In a preferred embodiment, the distance function $s(,)$ includes a sum of pixel value differences to a selected $q^{th}$ power, where q preferably equals 2. (This function is sometimes known as the L2 distance function.) In alternative embodiments, however, q might equal some other value, such as 1 or such as a value greater than 2, or some other distance function, such as the L∞ distance function, or the sum of absolute values of pixel value differences or a measure of information distance (such as for example an entropy measure of information distance or the Kolmogorov measure of algorithmic information distance) might be used.

Those skilled in the art will recognize, after perusal of this application, that the distance function $s(,)$ is applicable both to differences between entire sets of digital content, such as the original digital content 111 A and the post-attack digital content 112 $B_0$, but also to individual subsets thereof, down to individual blocks or macroblocks thereof.

While in a preferred embodiment, each $B_n$ is selected as close to A as possible, other techniques for goal seeking may alternatively be used, such as (1) to calculate a direction in which changing $d_n$ results in the largest reduction in difference and then to proceed in that direction until a minimum is reached, (2) Newton's method, (3) various neural networking or genetic optimization techniques, (4) techniques which are assisted in goal seeking by a human operator, (5) methods known in MRI imagery for image synchronization, or (6) some combination or conjunction or mixture thereof.

Method of Operation (Transforming Digital Content)

Figure 2:
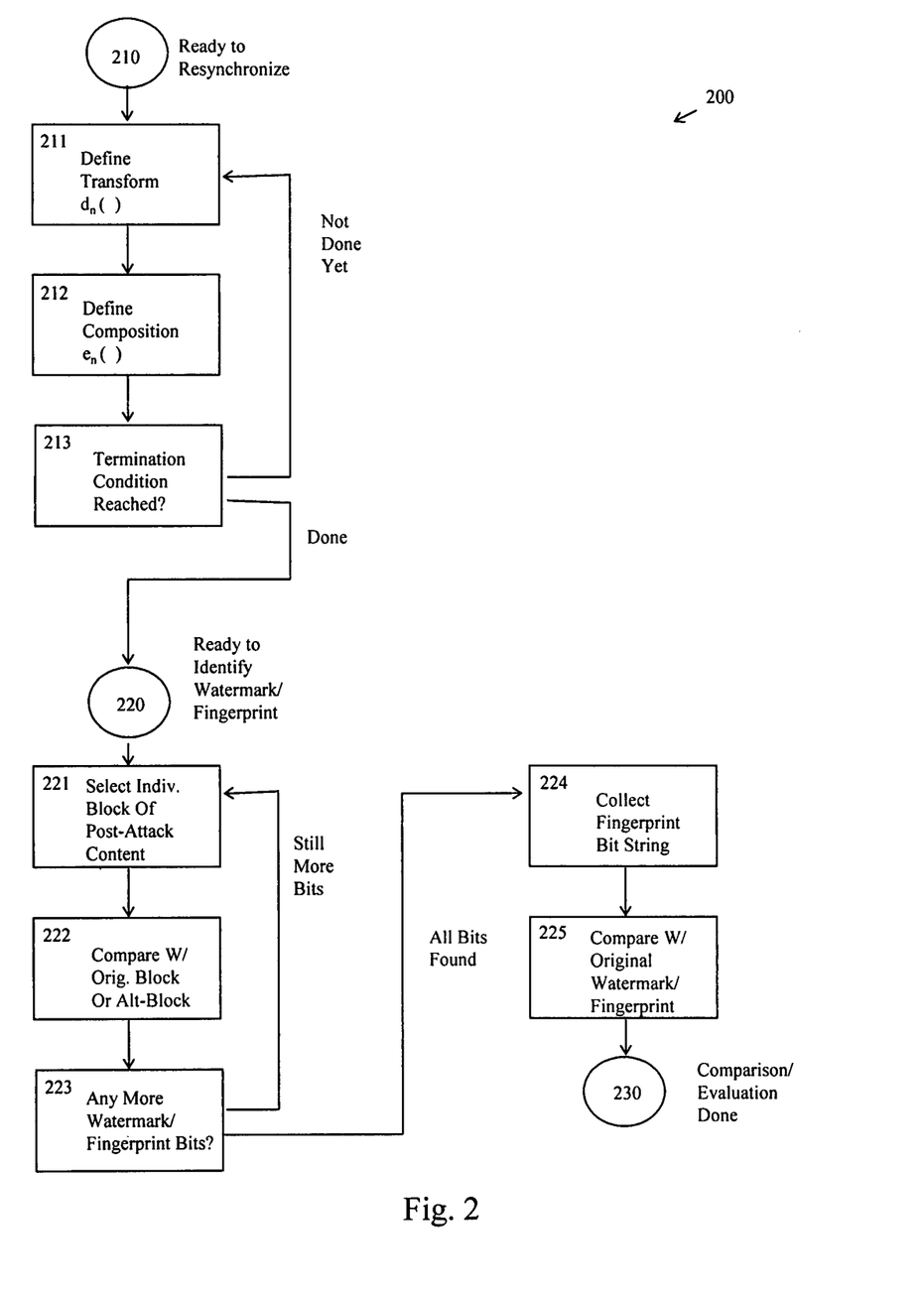
FIG. 2 shows a flow diagram of a method for recovering from de-synchronization attacks against watermarking and fingerprinting.

FIG. 2 shows a flow diagram of a method for recovering from de-synchronization attacks against watermarking and fingerprinting.

Although described serially, the flow points and method steps of the method 200 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

At a flow point 210, the method 200 is ready to resynchronize the original digital content 111 A and the post-attack digital content 112 $B_0$. Although the method 200 is described with regard to resynchronizing the actual data for A and $B_0$, there are numerous variations in which the actual data is not used, but some data responsive thereto, is used in combination, conjunction, or instead of the actual data.

For example, not intended to be limiting in any way, the data for A (the original digital content 111) might instead represent a composition of the original movie and its corresponding alt-movie. For a first example, not intended to be limiting in any way, the data for A might represent a weighted average thereof, such as for example an equally weighted average. For a second example, not intended to be limiting in any way, the data for A might represent a set of selected blocks from the original movie and the alt-movie, such as for example a pseudo-randomly selected sequence of blocks choices alternatively from the original movie and the alt-movie.

For example, not intended to be limiting in any way, the data for A (the original digital content 111) and the data for $B_n$ (the altered digital content 112 after a step n in the process) might instead include one of the following:

DCT coefficients or wavelet coefficients (for a set of suitably selected basis wavelets) representing original digital content 111 A and altered digital content 112 $B_n$.

For a first example, in the case of movies, selected frames might be underweighted (or even removed) or overweighted in comparison to original digital content 111 A and altered digital content 112 $B_n$. For MPEG-2 movies the method might be performed for I frames (intra-coded frames) or intra-coded blocks to arrive at a coarse-grain registration bringing $B_n$ close to A, at which point the method may be re-performed for additional frames (such as for example I frames, P frames and B frames) to arrive at a more fine-grained registration bringing $B_n$ close to A.

For a second example, in the case of movies, the method might be performed for selected "cuts" (sequences of frames representing a continuous scene) to arrive at a coarse-grain registration bringing $B_n$ close to A, at which point the method may be re-performed for additional cuts (such as for example the entire movie) to arrive at a more fine-grained registration bringing $B_n$ close to A.

Suitably processed or transformed values for original digital content 111 A and altered digital content 112 $B_n$.

For a first example, not intended to be limiting in any way, the data representing original digital content 111 A and altered digital content 112 $B_n$ might be filtered before processing, such as using a low-pass filter F[ ], or a sequence of such filters $F_n$[ ]. In such cases, earlier such filters $F_n$ (with relatively lower values of n) might be used to arrive at a coarse-grain deformation bringing F[$B_n$] close to F[A], at which point the method may be re-performed with later such filters $F_n$ (with relatively higher values of n) to arrive at a finer-grain deformation bringing $B_n$ close to A.

For a second example, not intended to be limiting in any way, the data representing original digital content 111 A and altered digital content 112 $B_n$ might be processed to determine their gradients G[ ]. In such cases, the method might be performed to arrive at a coarse-grain registration of edges in G[$B_n$] and G[A], at which point the method may be re-performed to arrive at an unfiltered deformation bringing $B_n$ close to A.

For a third example, not intended to be limiting in any way, the data representing original digital content 111 A and altered digital content 112 $B_n$ might be processed to alter their color gamuts or other perceivable features. In such cases, the method might be performed to arrive at a coarse-grain registration bringing $B_n$ close to A as perceived by an end viewer, at which point the method may be re-performed to arrive at a more fine-grained registration bringing $B_n$ close to A.

As described below, the method 200 performs the steps between the flow point 210 and the flow point 220 repeatedly for steps numbered n=1 to N, until a termination condition is reached. In a first preferred embodiment, the termination condition is deemed to be reached when $s(A, d_n(B_n)) < S_\infty$. A preferred value for $S_\infty$ is between about 0.5 and about 1.5 pixels or voxels. In a second preferred embodiment, the termination condition is deemed to be reached when $s(A, d_{n+1}(B_{n+1}))/s(A, d_n(B_n)) > R_\infty$. A preferred value for $R_\infty$ is about 0.95 and about 0.9995.

At a step 211, the method 200 defines a transformation $d_n(\ )$, for n>0. To perform this step, the method 200 performs the following sub-steps:

At a sub-step 211a, the method 200 selects a set of parameters $p_n$ defined for n. That is, the parameters $p_n$ are allowed to have (nonzero) values defined for them.

At a sub-step 211b, the method 200 selects a set of values $p_n^*$ for the parameters $p_n$ defined for n. That is, the parameters $p_n$ are set to the values $p_n^*$.

The method 200 selects the values $p_n^*$ to minimize a distance value $S_n = s(A, d_n(B_{n-1}))$. That is, the values $p_n^*$ are selected so that $S_n$ is the minimum value possible, given that only the parameters $p_n$ are allowed to have non-zero values defined for them.

As part of this sub-step, the external source 107 of transformation suggestions might assist the method 200, either by assisting or directing the selection of $p_n^*$, by assisting or directing the definition of $d_n(\ )$, or by assisting or directing the evaluation of $S_n$.

In one embodiment, $d_n(\ )$ might represent a linear-algebraic or other sum of transformations, responsive to a set of basic transformations selected by nonzero values of $p_n^*$, where $p_n$ represents those parameters allowed to be nonzero at step n.

At a step 212, the method 200 defines the function $e_n(\ )$ as the composition of all $d_j(\ )$, for j≤n. Thus, $e_0(\ )$ is the identity function, and $e_{n+1}(\ ) = d_{n+1}(e_n(\ ))$, and $e_{n+1}(B_0) = d_{n+1}(e_n(B_0))$.

At a step 213, the method 200 determines if the termination condition is reached. As noted above, in a first preferred embodiment, the termination condition is deemed to be reached when $S_n < S_\infty$. In a second preferred embodiment, the termination condition is deemed to be reached when $S_{n+1}/S_n > R_\infty$.

If the termination condition is reached, the method 200 continues with the flow point 220. If not, the method 200 iterates with the next value of n after the flow point 210.

Those skilled in the art would recognize, after perusal of this application, that the steps of the method 200 following the flow point 210 are similar to MRI registration, but with substantial differences involving distinctions between media streams and the static information that MRI registration is known to be applied to.

First, since the original digital content 111 and the post-attack digital content 112 both represent time-varying sequences, the method 200 involves registration both of individual elements of those sequences, as well as of the sequences themselves. Thus, the method 200 involves more than merely registration of (for example) individual frames of a movie, but also must register the ordering and timing of those frames. This is more involved than mere registration of two 3D objects. For example, a movie is a sequence of 2D objects, but the third dimension (time) has special properties. Thus for example, a time dimension might allow substantially severe local distortions (such as for example inserting or skipping an entire frame), but probably would not allow even moderate global distortions (such as a generically faster speed of motion), while in contrast, the spatial dimensions might allow moderate distortions both locally and globally.

Second, since the post-attack digital content 112 likely represents a (probably commercially) valuable representation of the same media stream as the original digital content 111, the method 200 can focus on those transformations that do not distort the original digital content 111 so badly as to make the represented media stream difficult to recognize by an end viewer.

Third, since it is desired to compare embedded fingerprinting or watermarking information, and since it is likely that such embedded information is likely to avoid substantial viewable effect on the original digital content 111, it is desirable to register the original digital content 111 with the post-attack digital content 112 to a degree smaller than individual pixels. In one embodiment, it is desirable to register the original digital content 111 with the post-attack digital content 112 to a degree smaller than individual voxels. In a preferred embodiment, registration would occur to about 0.2 pixels or voxels; in alternative embodiments, registration may occur to between about 0.01 to about 0.5 pixels.

Method of Operation (Comparing Watermarking and Fingerprinting)

At a flow point 220, the transformed digital content 113 is as similar as reasonably possible to the original digital content 111. The method 200 is ready to identify the post-attack digital content 112 as being derivative of the original digital content 111, in response to fingerprinting or watermarking information.

At a step 221, the method 200 selects an individual block 121 $M_i$ from the transformed digital content 113, for which post-attack fingerprinting or watermarking information 114 might be available. In one embodiment, the method 200 selects a block such as used in a technique described in a related application ("WATERMARKING AND FINGERPRINTING DIGITAL CONTENT USING ALTERNATIVE BLOCKS TO EMBED INFORMATION") in the incorporated disclosure.

At a step 222, the method 200 compares the selected individual block 121 $M_i$ with a corresponding block 122 $P_i$ and alt-block 123 $Q_i$ associated with the original digital content 111. To perform this step, the method 200 performs the following sub-steps:

At a sub-step 222a, the method 200 determines a distance value s ($M_i$, $P_i$) for the corresponding original block 122 $P_i$ associated with the original digital content 111.

At a sub-step 222b, the method 200 determines a distance value s ($M_i$, $Q_i$) for the corresponding alt-block 123 $Q_i$ associated with the original digital content 111.

At a sub-step 222c, the method 200 determines whether the selected individual block 121 $M_i$ is closer to the corresponding original block 122 $P_i$ or the corresponding alt-block 122 $Q_i$, according to the distance function s(,).

At a sub-step 222d, the method 200 records a result of the comparison, including at least one individual bit 124 $F_i$ representing whether the selected individual block 121 $M_i$ is closer to the corresponding original block 122 $P_i$ or the corresponding alt-block 123 $Q_i$. In one embodiment, the method 200 records the measured distance values as well, with the effect of maintaining information regarding a confidence value (or other assignable weight) for the individual bit 124 $F_i$.

At a step 223, the method 200 determines if there are further individual blocks 121 $M_i$ from the transformed digital content 113. If so, the method 200 continues with the step 221, until there are no more such individual blocks 121 $M_i$. If not, the method 200 continues with the next step.

At a step 224, the method 200 collects the individual bits 124 $F_i$, defining the sequence thereof as post-attack fingerprinting or watermarking information 114 identified in response to the transformed digital content 113. As noted above, the post-attack fingerprinting or watermarking information 114 should be substantially similar to fingerprint information such as embedded in the original digital content 111, such as described in a related application ("WATERMARKING AND FINGERPRINTING DIGITAL CONTENT USING ALTERNATIVE BLOCKS TO EMBED INFORMATION") in the incorporated disclosure.

At a step 225, the method 200 compares the post-attack fingerprinting or watermarking information 114 with original fingerprinting or watermarking information 115 identifiable from the original digital content 111. In a preferred embodiment, the method 200 identifies original fingerprinting or watermarking information 115 identifiable from the original digital content 111 using the same technique from a related application.

In one embodiment, the method 200 uses a technique such as described in a related application ("DETECTING COLLUSION AMONG MULTIPLE RECIPIENTS OF FINGERPRINTED INFORMATION") to evaluate whether the post-attack digital content 112 can be identified as derivative of the original digital content 111 (in the case of watermarking information), or whether the post-attack digital content 112 can be identified as derivative of at least one specific copy of the original digital content 111 (in the case of fingerprinting information).

At a flow point 230, the method 200 has compared embedded fingerprinting or watermarking information obtained in response to the original digital content 111 and the post-attack digital content 112, and evaluated whether the post-attack digital content 112 is derivative of the original digital content 111 (or a specific copy thereof).

In alternative embodiments, where a specific set F of embedded fingerprinting or watermarking information is suspected to be present in the post-attack digital content 112, the method 200 may determine distinct transformations $^0e_N(\ )$ and $^1e_N(\ )$, where $^0e_N(\ )$ is a transformation that brings the post-attack digital content 112 closest to the original digital content 111 without any embedded fingerprinting or watermarking information, or with that embedded fingerprinting or watermarking information uniformly logical "0", and where $^1e_N(\ )$ is a transformation that brings the post-attack digital content 112 closest to the original digital content 111 with the specific set F of fingerprinting or watermarking information embedded therein. Thus, s (A, $^0e_N(B_0)$) is minimized when A has $F_i$ uniformly logical "0", while s (A, $^1e_N(B_0)$) is minimized when A has $F_i$ set to a selected sequence of bits F.

In such alternative embodiments, the method 200 would conclude that the post-attack digital content 112 did or did not have the specific set F of embedded fingerprinting or watermarking information, that is, that the original digital content 111 did or did not include F, in response to the distinct transformations $^0e_N(\ )$ and $^1e_N(\ )$. For example, not intended to be limiting in any way, the method 200 might conclude that original digital content 111 included F if $^1e_N(\ )$ was closer to an identity transform than $^0e_N(\ )$, if $^1e_N(\ )$ was more linear than $^0e_N(\ )$, or if $^1e_N(\ )$ had less entropy than $^0e_N(\ )$, or if $^1e_N(\ )$ had less algorithmic complexity than $^0e_N(\ )$.

Generality of the Invention

The invention is useful for, and has sufficient generality for, applications other than distribution of streaming media, and to other than distribution of digital content. For example, the invention is also generally useful for applications in which security of datasets or identifying recipients of those datasets is desired.

Although preferred embodiments are disclosed herein, many variations are possible which remain within the concept, scope, and spirit of the invention. These variations would become clear to those skilled in the art after perusal of this application.

For a first example, not intended to be limiting in any way, techniques described herein may be used for inverting transformations that were not originally intended to distort the media stream, even when the original digital content 111 is not known. Such transformations might include transcoding the media stream from its original digital content 111 to another encoding format. Transcoding pairwise among NTSC, PAL, SECAM, and RGB, may be inverted using techniques described herein. Transcoding between interlaced and non-interlaced formats may be inverted using techniques described herein. Transcoding that reverses pull-down may be found using techniques described herein. In such cases, techniques described herein may seek to minimize some aspect of the transformation $e_N()$, similar to selecting between the distinct transformations $^0e_N()$ and $^1e_N()$ described above.

For a second example, not intended to be limiting in any way, techniques described herein may be used for inverting transformations that were originally intended to distort the media stream, but which are known to come from a selected class of transformations. Such transformations might include video "scrambling" transformations such as analog hiding of information not rising to the level of a cryptographically secure transformation.

Those skilled in the art will recognize, after perusal of this application, that these alternative embodiments are illustrative and in no way limiting.

The invention claimed is:

1. A method of resynchronizing post-attack digital content with original digital content, comprising:
   determining a first transformation;
   applying the first transformation to the post-attack digital content to produce first transformed post-attack digital content;
   determining a first difference between the first transformed post-attack digital content and the original digital content;
   if the first determined difference does not indicate a selected degree of similarity between the first transformed post-attack digital content and the original digital content, then:
      determining a second transformation;
      applying the second transformation to the post-attack digital content to produce second transformed post-attack digital content;
      determining a second difference between the second transformed post-attack digital content and the original digital content;
   in response to the second determined difference indicating a selected degree of similarity and based, at least in part, on the second transformed post-attack digital content and the original digital content, determining embedded information from the second transformed post-attack digital content,
   wherein the determining the first difference comprises obtaining a distance measure between the first transformed post-attack digital content and the original digital content, and the determining the second difference comprises obtaining a distance measure between the second transformed post-attack digital content and the original digital content, and
   wherein the distance measure is responsive to a measure of spatial differences between corresponding pixels in a media stream in the spatial domain, and
   wherein the method is performed by at least one processor.

2. The method of claim 1, further comprising:
   transcoding the post-attack digital content.

3. The method of claim 1, wherein the original digital content includes a representation of a media stream.

4. The method of claim 1, wherein the original digital content includes a representation of an audio or visual presentation.

5. The method of claim 1, wherein the original digital content includes a representation of a streaming media.

6. The method of claim 1, wherein the original digital content includes a representation of an original media stream; and the each of the first and second transformed post-attack digital content includes a representation of a media stream similar to the original media stream.

7. The method of claim 1, wherein the original digital content includes a representation of an original media stream; and the each of the first and second transformed post-attack digital content includes a transcoded representation of a media stream similar to the original media stream.

8. The method of claim 1, wherein the embedded information includes a fingerprint or watermark.

9. The method of claim 1, wherein the embedded information is indicative of a recipient of the original digital content.

10. The method of claim 1, wherein the embedded information is indicative of an originator of the original digital content.

11. The method of claim 1, wherein the determining the first or second difference comprises:
    comparing a ratio of earlier and later values of the distance measure with a selected threshold.

12. The method of claim 1, wherein the determining the first or second difference comprises:
    comparing a value of the distance measure with a selected threshold.

13. The method of claim 1, wherein the determining the first transformation comprises:
    selecting the first transformation from a limited set of possible transformations; and
    wherein the determining the second transformation comprises: selecting the second transformation from a less limited set of possible transformations.

14. The method of claim 1, wherein the determining the first transformation comprises:
    selecting the first transformation from a linear set of possible transformations; and
    wherein the determining the second transformation comprises: selecting the second transformation from a less linear set of possible transformations.

15. The method of claim 1, wherein the determining the first transformation comprises:
    selecting the first transformation from a set of possible transformations having less possible distortion; and
    wherein the determining the second transformation comprises: selecting the second transformation from a set of possible transformations having more possible distortion.

16. The method of claim 1, wherein the determining the first transformation comprises:
    selecting the first transformation from a set of simpler possible transformations; and
    wherein the determining the second transformation comprises: selecting the second transformation from a set of less simple possible transformations.

17. The method of claim 1, wherein the distance measure is responsive to differences in a media stream having both spatial and timing components.

18. The method of claim 1, wherein at least one of the first or second transformations is based at least in part on a suggestion received from an external source; and wherein either the distance measure or the selected degree of similarity is based at least in part on an evaluation received from an external source.

19. The method of claim 18, wherein the external source includes at least one of: a human being, a computer program, an external device, and a neural network.

20. The method of claim 1, wherein the original digital content includes a visual representation; and wherein the second transformed post-attack digital content is synchronized to within less than a pixel of the original digital content.

21. The method of claim 1, wherein the original digital content includes a visual time-sequenced representation; and wherein the second transformed post-attack digital content is synchronized to within less than a voxel of the original digital content.

22. The method of claim 1, wherein the applying a first or second transformation comprises application of a plurality of distinct types of transformations in an iterated sequence.

23. The method of claim 1, wherein the embedded information has no known predictable characteristics capable of being used for those steps of resynchronizing.

24. The method of claim 1, wherein at least one of the first or second transformations comprises cubic spline interpolation of basis functions.

25. The method of claim 1, wherein the original digital content includes a representation time-sequence using a sequence of frames; and wherein the second transformed post-attack digital content is synchronized to within less than one frame unit of the original digital content.

26. A computer-readable medium having computer-executable instructions, which when executed, perform a method of resynchronizing post-attack digital content with original digital content, comprising:
   determining a first transformation;
   applying the first transformation to the post-attack digital content to produce first transformed post-attack digital content;
   determining a first difference between the first transformed post-attack digital content and the original digital content;
   if the first determined difference does not indicate a selected degree of similarity between the first transformed post-attack digital content and the original digital content, then:
      determining a second transformation;
      applying the second transformation to the post-attack digital content to produce second transformed post-attack digital content;
      determining a second difference between the second transformed post-attack digital content and the original digital content;
   in response to the second determined difference indicating a selected degree of similarity and based, at least in part, on the second transformed post-attack digital content and the original digital content, determining embedded information from the second transformed post-attack digital content,
   wherein the determining the first difference comprises obtaining a distance measure between the first transformed post-attack digital content and the original digital content, and the determining the second difference comprises obtaining a distance measure between the second transformed post-attack digital content and the original digital content, and
   wherein the distance measure is responsive to a measure of spatial differences between corresponding pixels in a media stream in the spatial domain.

* * * * *